United States Patent Office 3,816,504
Patented June 11, 1974

3,816,504
(POLYHALOALKYL)-VINYLBENZONITRILE COMPOUNDS
Leo R. Morris, Midland, Mich., assignor to
The Dow Chemical Company, Midland, Mich.
No Drawing. Filed Sept. 25, 1970, Ser. No. 75,759
Int. Cl. A01n 9/20; C07c 121/52
U.S. Cl. 260—465 G        4 Claims

ABSTRACT OF THE DISCLOSURE

Compounds of the formula

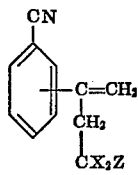

wherein X is Br or Cl and Z is H, X or alkyl of one to four carbon atoms, which compounds when pure are viscous liquids and are useful as herbicides.

SUMMARY OF THE INVENTION

The present invention relates to substituted benzenes, and more particularly to new compounds of the general formula

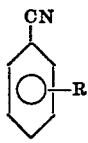

wherein R is a substituted alkyl group corresponding to

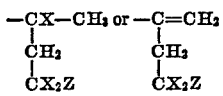

and wherein X is Br or Cl, and Z is H, X or alkyl of from one to four carbon atoms.

These new compounds are viscous liquids when in pure form. They are useful as herbicides, displaying this activity regardless of whether application is to the soil in which the seeds are planted or to the growing plant itself. They are particularly effective against a variety of common weed pests, demonstrating a selectivity for a number of weed species when present along with commonly desirable crops.

In general the new compounds of this invention are made by the method disclosed in U.S. Pat. No. 3,454,657. Thus, the *meta*- or *para*-(1-methylvinyl)-benzonitrile is reacted with an appropriate halogenated alkane to yield the addition product of the halogenated alkane to the carbon-carbon double bond. The halogenated alkane used has the general formula

wherein X is Br or Cl and Z is X, H or alkyl of from one to four carbon atoms. The reaction is carried out in a Cu⁺-amine catalyst system at reflux. The product of this reaction is the *m*-polyhaloalkylbenzonitrile when *m*-(1-methylvinyl)benzonitrile is the starting material, and the *para* isomer when *p*-(1-methylvinyl)benzonitrile is the starting material.

This *meta*- or *para*-polyhaloalkylbenzonitrile is then thermally dehydrohalogenated in the presence of a steel wool and/or zinc chloride catalyst, yielding the corresponding *meta*- or *para*-(1-(polyhaloalkyl)vinyl)-benzonitrile.

These new compounds can be separated from the reaction mixture and purified by procedures like those known to chemists skilled in the art. Thus, separation techniques include distillation, solvent extraction, filtration and the like; and purification techniques include distillation, recrystallization and the like.

The present invention is exemplified by, but not limited to, the following examples.

DESCRIPTION OF PREFERRED EMBODIMENTS

Example 1(a).—Preparation of *m*-(1,3,3,3-tetrachloro-1-methylpropyl)benzonitrile A solution of 12.7 g. of *m*-(1-methylvinyl)-benzonitrile in 34 ml. of $CCl_4$ was mixed with 0.098 g. of anhydrous CuCl and heated to mild reflux (approximately 90° C.). Then 0.85 ml. of piperidine was added over a 5 minute period and the system further refluxed for 30 minutes. After cooling, washes with 25 ml. of dilute HCl and with two portions of distilled water gave the organic layer that was dried with anhydrous sodium sulfate. Concentration *in vacuo* to remove solvent was made with heating to 60° C. at 10 mm. Hg, giving 23 g. of dark, viscous residue, $n_D^{25}$ 1.5713. Infrared analysis of this product showed the expected peaks at 4.47μ for the cyano group, 7.23μ for the methyl group, and a 9.44μ peak typical of the tetrachlorobutyl side-chain in such compounds.

Example 1(b).—Preparation of *m*-(1-(2,2,2-trichloroethyl)-vinyl)benzonitrile

A 5.0 g. sample of the above described tetrachloro adduct was heated in a small distillation flask with a small strand of steel wool to 125–150° C. under aspirator vacuum for 10 minutes. Further heating at high vacuum to 160° pot temperature then started distillation to give 2.3 g. of the dehydrochlorinated product, B.P. 145–155° C. at 0.2–0.3 mm. of Hg, $n_D^{25}$ 1.5742. An NMR analysis was entirely consistent with the assigned structure. Calculation for elemental analysis of $C_{11}H_8Cl_3N$ yields Cl=41.0 and N=5.4; actually found was Cl=40.9 and N=5.4.

In a manner similar to the procedure used in the above example, other compounds of the present invention are prepared as follows:

From 1,1,1-trichloropropane and *m*- or *p*-(1-methylvinyl)benzonitrile, *m*- or *p*-(1,3,3-trichloro-1-methylpentyl)benzonitrile is made and then dehydrochlorinated to yield *m*- or *p*-(1-(2,2-dichlorobutyl)vinyl)benzonitrile.

From 1,1,1-tribromopropane and *m*- or *p*-(1-methylvinyl)benzonitrile, *m*- or *p*-(1,3,3-tribromo-1-methylpentyl)benzonitrile is made and then dehydrobrominated to yield *m*- or *p*-(1-(2,2-dibromobutyl)vinyl)benzonitrile.

From chloroform and *m*- or *p*-(1-methylvinyl)benzonitrile, *m*- or *p*-(1,3,3-trichloro-1-methylpropyl)benzonitrile is made and then dehydrochlorinated to yield *m*- or *p*-(1-(2,2-dichloroethyl)vinyl)benzonitrile.

From bromoform and *m*- or *p*-(1-methylvinyl)benzonitrile, *m*- or *p*-(1,3,3-tribromo-1-methylpropyl)benzonitrile is made and then dehydrobrominated to yield *m*- or *p*-(1-(2,2-dibromoethyl)vinyl)benzonitrile.

In representative operations, herbicidal activity studies were made with *m*-(1,3,3,3-tetrachloro-1-methylpropyl)benzonitrile and *m*-(1-(2,2,2-trichloroethyl)vinyl)benzonitrile using the following methods.

Test method 1 involved pouring an aqueous solution of one of the compounds onto soil immediately after the seeds were planted so as to provide a dosage rate of the compound of either 5 or 50 pounds per acre.

In test method 2, soil was drenched with an aqueous solution of one of the compounds at a dosage rate of 1.25 or 0.62 pounds per acre, and then the seeds were planted.

In test method 3, the growing plants were sprayed with a 0.4 percent aqueous solution of one of the compounds until wet to runoff.

In each test the plants were examined after two weeks to determine the percent kill, 100% indicating all plants dead. Table 1 summarizes the plants studied, i.e., seeds planted and the results obtained.

TABLE 1

| Run No. | Plant | Test 1 | | Test 2 | | Test 3, percent kill |
|---|---|---|---|---|---|---|
| | | Dosage, lbs./acre | Percent kill | Dosage, lbs./acre | Percent kill | |
| m-(1,3,3,3-tetrachloro-1-methylpropyl)benzonitrile | | | | | | |
| 1 | Wild oats | 50 | 8 | | | |
| 2 | Japanese millet. | 50 | 70 | | | |
| 3 | Sorghum/milo. | 50 | 100 | | | 90 |
| 4 | Pigweed | | | 1.25 | 100 | |
| 5 | Barnyard grass. | | | 1.25 | 95 | |
| m-(1-(2,2,2-trichloroethyl)vinyl)benzonitrile | | | | | | |
| 6 | Barnyard grass. | | | 0.62 | 100 | |
| 7 | Pigweed | 5 | 95 | 0.62 | 100 | |
| 8 | German millet. | 5 | 90 | | | |
| 9 | Sundan grass. | 5 | 97 | | | |
| 10 | Meadow fescue. | 5 | 100 | | | |
| 11 | Japanese millet. | 5 | 98 | | | |
| 12 | Wild oats | 5 | 95 | | | |
| 13 | Crabgrass | 5 | 100 | | | 90 |
| 14 | Sorghum/milo. | | | | | 80 |

In other representative operations which followed the same general procedures of test methods 1 through 3, when either m-(1,3,3,3-tetrachloro-1-methylpropyl)benzonitrile or m-(1-(2,2,2-trichloroethyl)vinyl)benzonitrile was applied in aqueous solution at a dosage rate of 50 or 5 pounds of compound per acre, respectively, to soil in which the seeds of soybean, radish, corn and cucumber crop plants had been planted, only a small percentage of the plants were found to be dead after two weeks.

The 1-methylvinylbenzonitrile isomers used as the starting materials in the present invention are prepared by known procedures. One possible way to make the meta isomer of this starting material is via the following reaction sequence: (1) a Grignard reaction of $CH_3MgBr$ with m-bromoacetophenone, followed by distillation in the presence of sodium bisulfate, to give m-bromo-α-methylstyrene, and (2) reaction of this styrene with $Cu_2(CN)_2$ in the presence of pyridine to yield meta-(1-methylvinyl)benzonitrile. See W. E. Ross and R. C. Fuson, The Journal of the American Chemical Society, 59, 1408 (1937); Y. Okamoto et al., The Journal of the American Chemical Society, 80, 4969 (1958). In a similar manner, para-(1-methylvinyl)benzonitrile is synthesized by starting with para-bromoacetophenone.

I claim:

1. A compound of the formula:

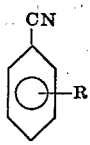

wherein R is

and wherein X is Br or Cl and Z is hydrogen, X or alkyl of from one to four carbon atoms.

2. A compound of claim 1 wherein the R group is

said group being meta or para to the cyano group.

3. A compound of claim 1 wherein said R group is meta to the cyano group.

4. The compound of claim 1 which is m-(1-(2,2,2-trichloroethyl)vinyl)benzonitrile.

References Cited
UNITED STATES PATENTS

| 3,509,222 | 4/1970 | Howe et al. | 260—651 |
| 2,435,790 | 2/1948 | Long | 260—465 G |
| 2,606,213 | 8/1952 | Ladd et al. | 260—465 G X |

OTHER REFERENCES

Davies et al., Chemical Abstracts, volume 33, 4210 (1939).

White et al., J. Am. Chem. Soc., volume 83, pp. 3846 to 3853 (1961).

FLOYD D. HIGEL, Primary Examiner

U.S. Cl. X.R.

71—105; 260—465 K